June 11, 1940.  J. H. BRACKETT  2,204,268
APPARATUS FOR FOLDING SHEETS OF FABRIC AND THE LIKE
Filed Oct. 24, 1938  6 Sheets-Sheet 1

INVENTOR
JAMES H. BRACKETT
BY
HARRIS, KIECH, FOSTER & HARRIS
ATTORNEYS

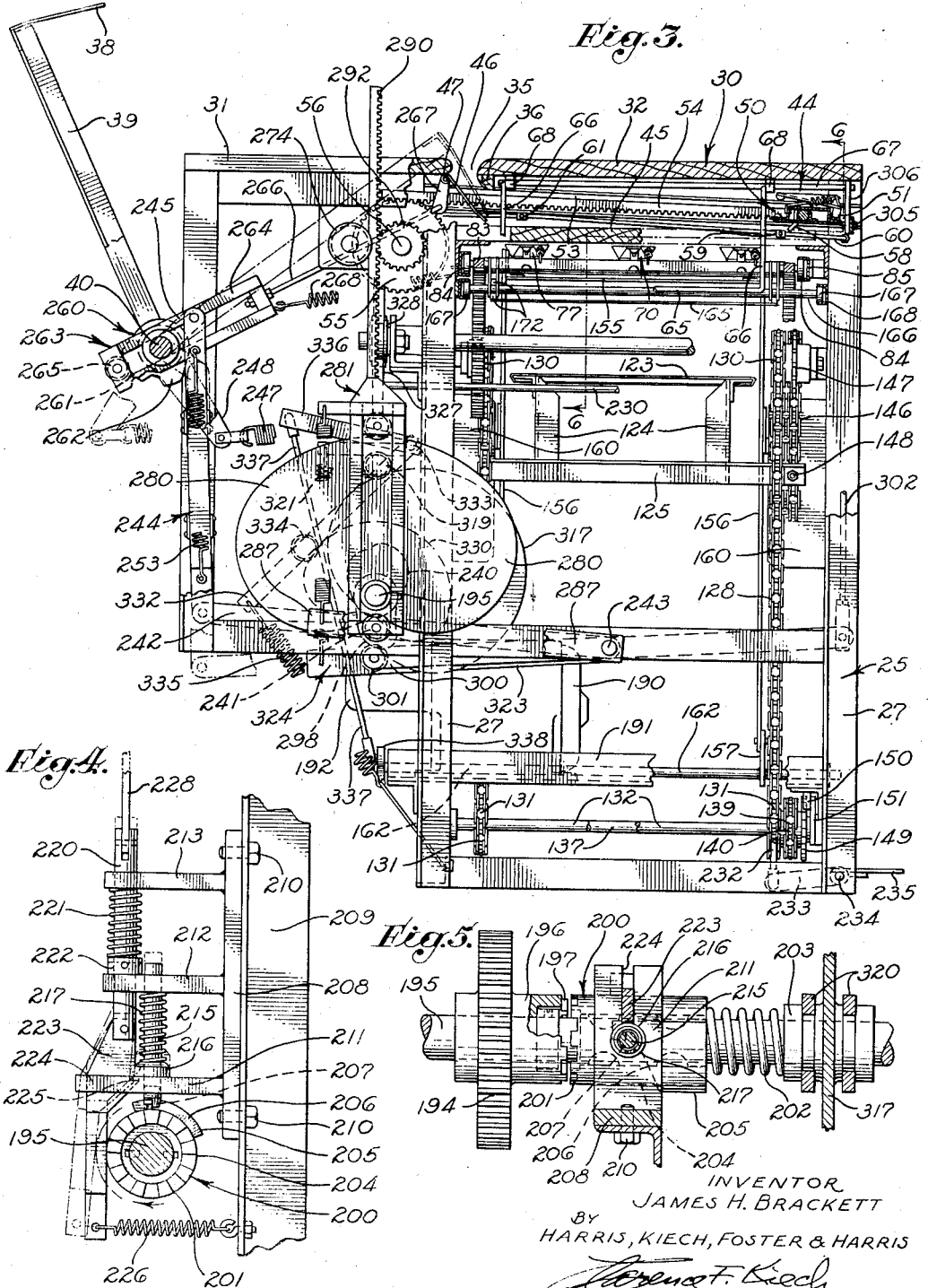

June 11, 1940.  J. H. BRACKETT  2,204,268
APPARATUS FOR FOLDING SHEETS OF FABRIC AND THE LIKE
Filed Oct. 24, 1938  6 Sheets-Sheet 3
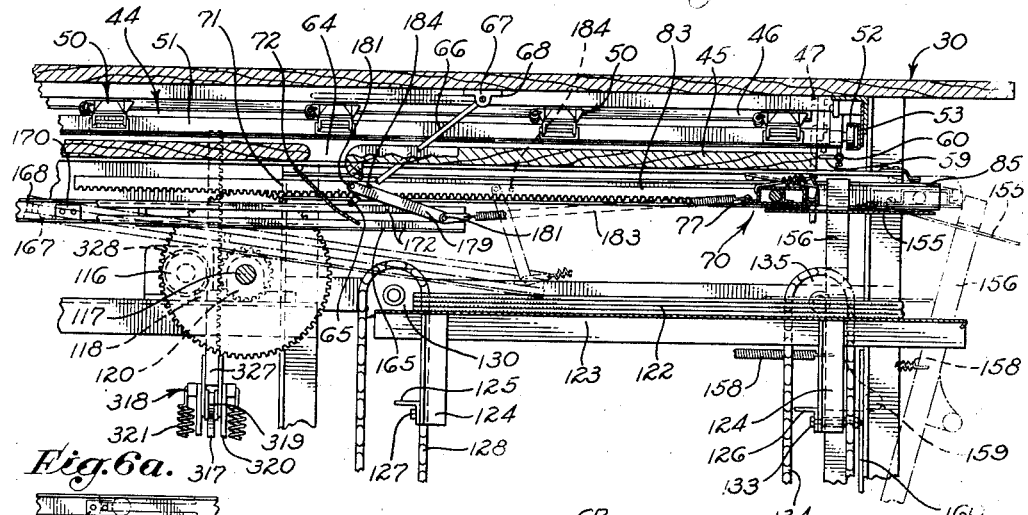
Fig. 6.
Fig. 6a.
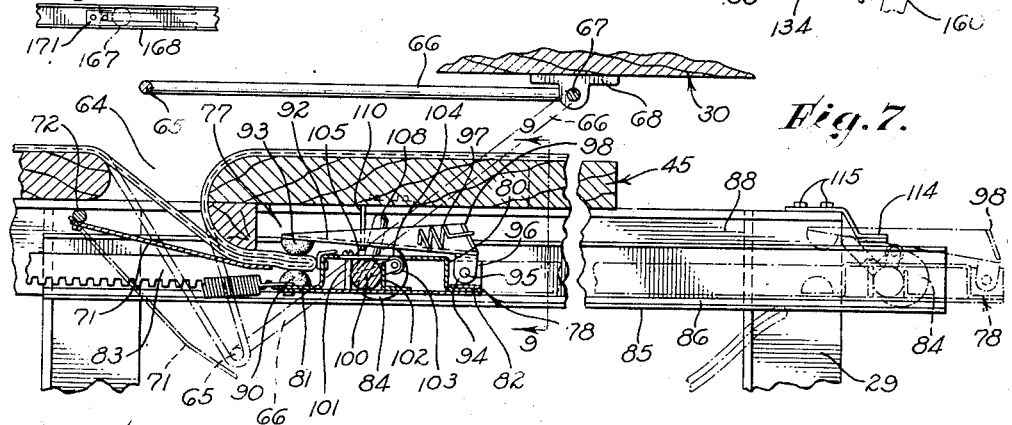
Fig. 7.
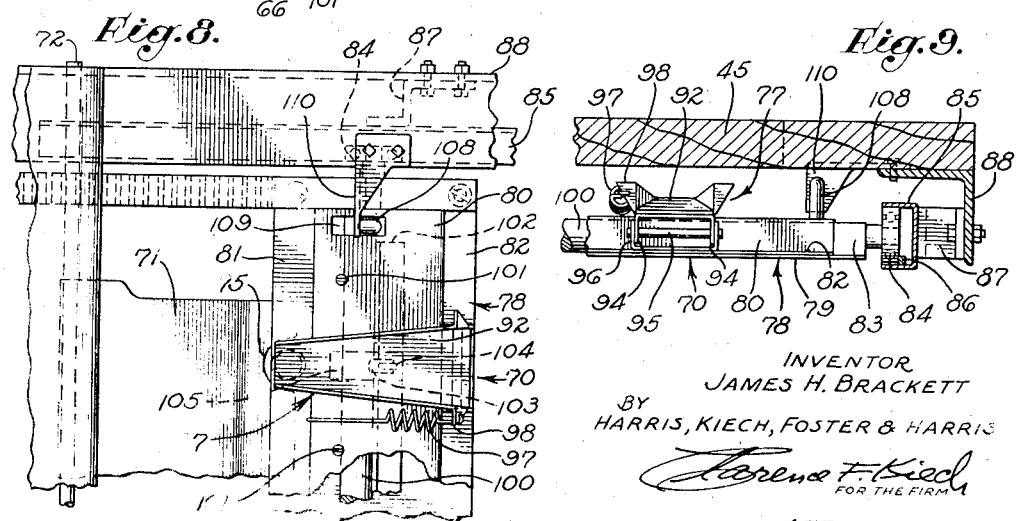
Fig. 8.
Fig. 9.
INVENTOR
JAMES H. BRACKETT
BY
HARRIS, KIECH, FOSTER & HARRIS
FOR THE FIRM
ATTORNEYS June 11, 1940.    J. H. BRACKETT    2,204,268
APPARATUS FOR FOLDING SHEETS OF FABRIC AND THE LIKE
Filed Oct. 24, 1938    6 Sheets-Sheet 4
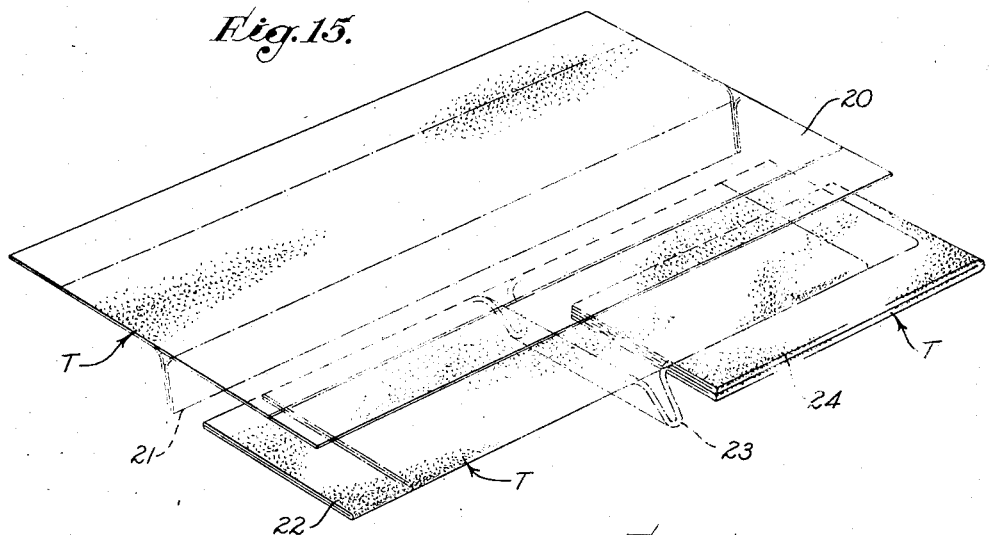
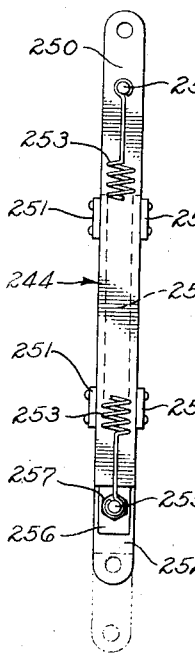
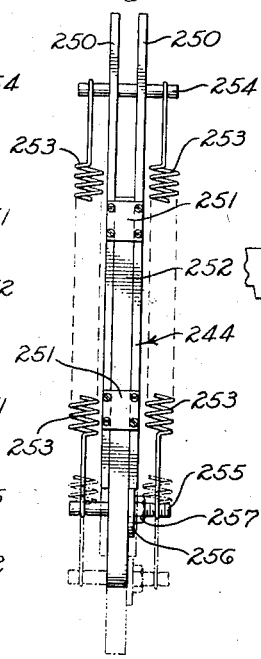
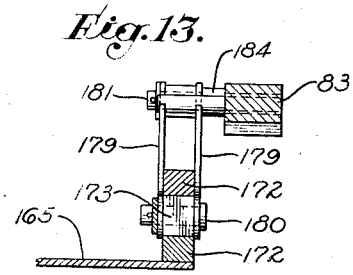
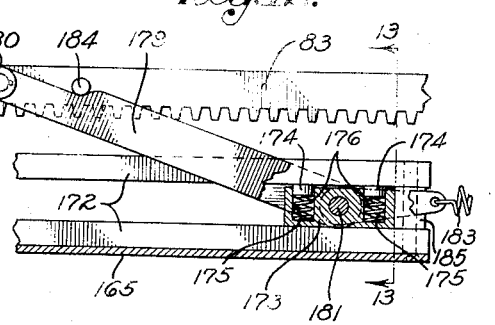
INVENTOR
JAMES H. BRACKETT
BY
HARRIS, KIECH, FOSTER & HARRIS
*Terence F. Kiel*
FOR THE FIRM
ATTORNEYS June 11, 1940.  J. H. BRACKETT  2,204,268
APPARATUS FOR FOLDING SHEETS OF FABRIC AND THE LIKE
Filed Oct. 24, 1938    6 Sheets-Sheet 5
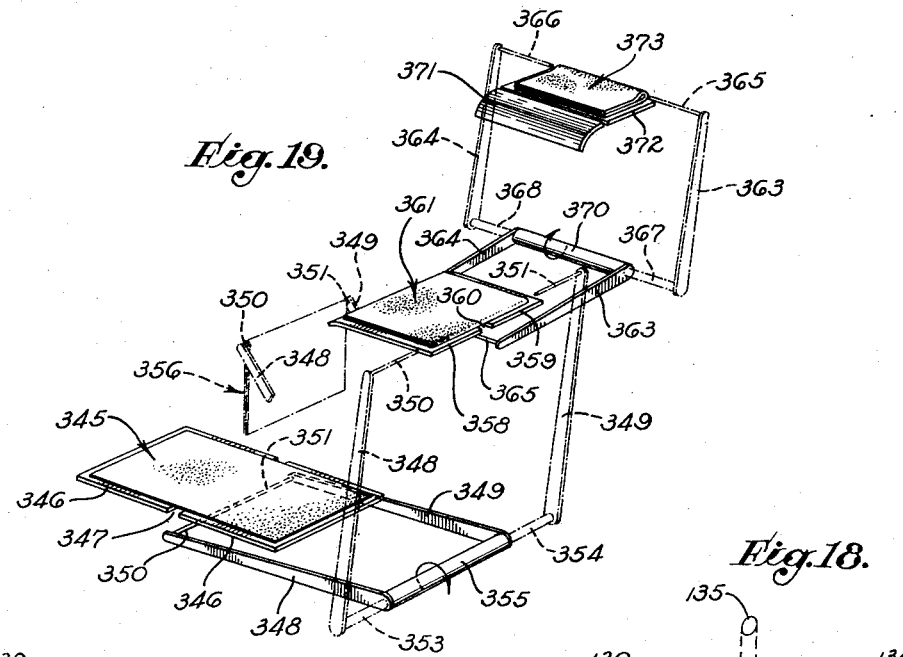
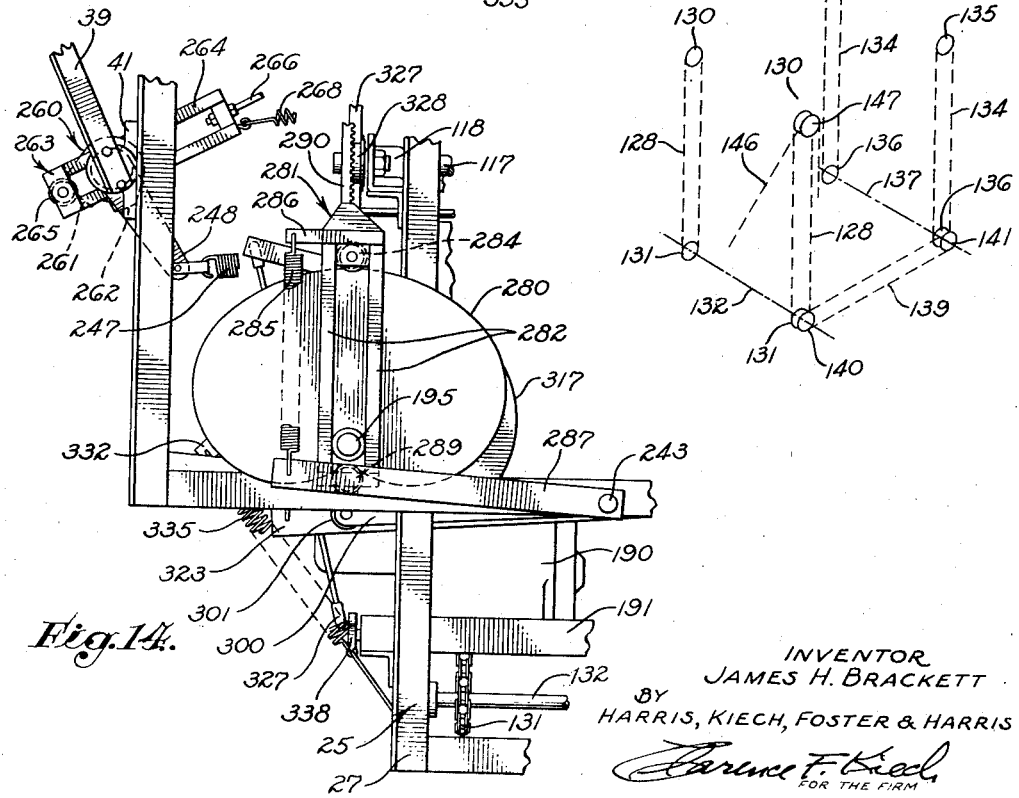
INVENTOR
JAMES H. BRACKETT
BY
HARRIS, KIECH, FOSTER & HARRIS
FOR THE FIRM
ATTORNEYS June 11, 1940.　　　　J. H. BRACKETT　　　　2,204,268
APPARATUS FOR FOLDING SHEETS OF FABRIC AND THE LIKE
Filed Oct. 24, 1938　　　　6 Sheets-Sheet 6

INVENTOR
JAMES H. BRACKETT
BY
HARRIS, KIECH, FOSTER & HARRIS
ATTORNEYS

Patented June 11, 1940

2,204,268

UNITED STATES PATENT OFFICE 2,204,268

APPARATUS FOR FOLDING SHEETS OF FABRIC AND THE LIKE

James H. Brackett, Pasadena, Calif.

Application October 24, 1938, Serial No. 236,716

9 Claims. (Cl. 270—62)

My invention relates to folding devices, particularly devices for folding sheets of flexible material, and is directed specifically to an improved method and apparatus for folding such sheets automatically in rapid succession. While my invention has wide application in various fields, it offers outstanding advantages when embodied in a laundry machine designed to fold flat-work. For the purpose of this disclosure, I elect, therefore, to describe such a machine, but it is to be understood that my invention is not limited to any specific field.

One object of my invention is to provide a compact folding machine that is flexible in the sense that it may be employed equally well for a long run of uniform flat-work for hotel, hospital and linen supply service and for runs of family flat-work of non-uniform sizes. More specifically, I propose to design a folding machine that will not require adjustment for handling different sizes of flat-work.

Various folding machines heretofore proposed and employed have been cumbersome, bulky devices that are wasteful of space especially when out of service. Another object of my invention is to provide an efficient, compact machine having the character of a table and serviceable as a table when not employed as a folder.

In the prevailing practice, flat-work is transported from a mangle to a table for folding by hand. It has been found that approximately sixty per cent of the time consumed in the manual procedure of folding is devoted to picking up the sheet of material and spreading it out on the work-table, only forty per cent of the time being required to carry out the subsequent folding operations. One object of my invention is to provide a portable or semi-portable folding machine adapted to receive work directly from a mangle. When employed in this manner, my invention eliminates entirely the usual transportation to a folding table, and since the sheet of material is discharged from the mangle in a flat disposition the usual operation of spreading out the sheet of material preparatory to folding is also eliminated. It is contemplated that the only manual operation required between the mangle and the folding machine will be guidance to a feed position on the folder.

A further object of my invention is to incorporate in such a folding machine, means for receiving the finished articles that is adapted to build up a stack of the finished articles for transportation away from the folder. More specifically, it is my purpose to receive the finished objects successively on the top of a stack and to maintain the top of a stack at a substantially constant receiving level.

My invention as embodied in the specific form of the present disclosure is characterized by the conception that a sheet of flexible material such as a towel or a napkin may be folded by forcing the sheet laterally through a slot along a fold line of the sheet. One object of my invention is to provide means acting in sequence to force a flexible sheet through a succession of such slots to form multiple folds in the sheet.

In the preferred form of my invention I propose to have the unfolded sheet placed initially on an upper support having the character of a table top and to carry the sheet downwardly through successive slots to successively lower levels. A feature of my invention is the conception of a reciprocating tray cooperative with the means that forces the sheets through the final slot, the reciprocating tray facilitating the delivery of the finished article to a finished stack.

Other objects and advantages, particularly those relating to the actuating and timing means incorporated in the folding machine, will be apparent in my more detailed description to follow, taken with the accompanying drawings.

In the drawings:

Fig. 3 is a side elevation as viewed from the left of Fig. 1;

Fig. 4 is an enlarged fragmentary view taken as indicated by the line 4—4 of Fig. 1 showing in side elevation the clutch mechanism of the machine;

Fig. 5 is a fragmentary section taken as indicated by the line 5—5 of Fig. 1;

Fig. 6 is a fragmentary vertical section on a slightly enlarged scale taken as indicated by the line 6—6 of Fig. 3;

Fig. 6a is a fragmentary view of a track incorporated in the apparatus;

Fig. 7 is an enlarged fragmentary section showing the construction of the secondary folding mechanism of the apparatus;

Fig. 8 is a fragmentary view showing a portion of Fig. 7 in plan;

Fig. 9 is a fragmentary vertical section taken as indicated by the line 9—9 of Fig. 7;

Fig. 10 is a side elevation on an enlarged scale of an extensile link employed in my apparatus;

Fig. 11 is a front elevation of Fig. 10;

Fig. 12 is an enlarged fragmentary view, partly in section, showing mechanism employed to control a tray that is incorporated in the apparatus;

Fig. 13 is a fragmentary section taken as indicated by the line 13—13 of Fig. 12;

Fig. 14 is a fragmentary view showing in side elevation a cam and cooperative means for controlling a portion of the mechanism employed in my apparatus;

Fig. 15 is a diagrammatic phantom view showing a sheet at various stages in my preferred folding procedure;

Fig. 18 is a diagrammatic view in perspective of interlocking sprockets associated with the stacking platform of my apparatus; and Fig. 19 is a diagrammatic view in perspective to indicate the mode of operation of a second embodiment of my apparatus for carrying out a second form of my folding process.

Figure 1:
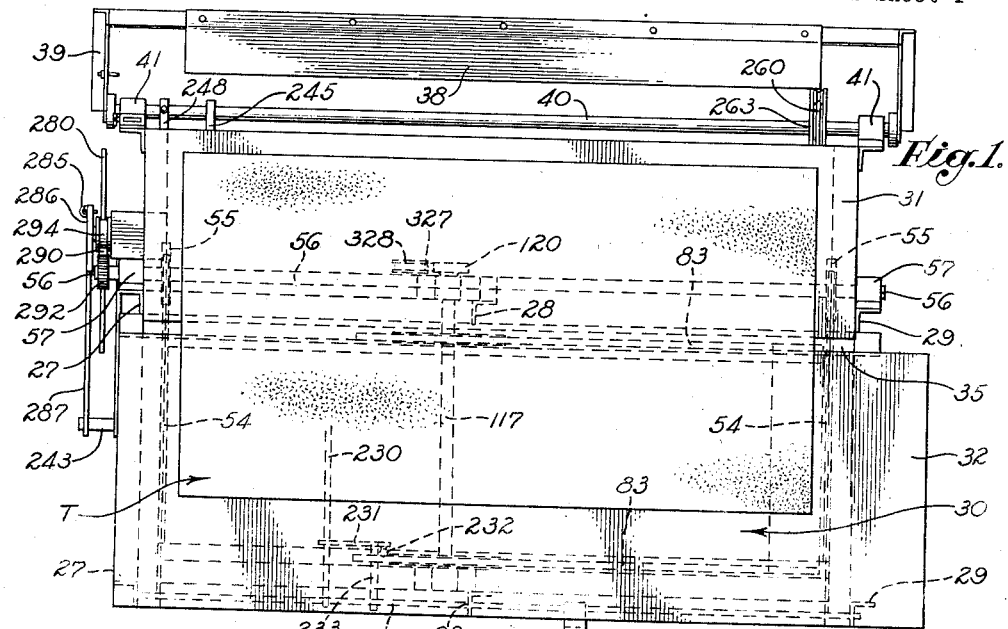
Fig. 1 is a plan view of the preferred form of my apparatus with the movable parts in the positions at the beginning of a machine cycle.

An understanding of my machine in the preferred form may be approached by considering Fig. 15, a phantom view representing the progress of a towel T through the folding process. Initially the towel is spread out on an upper supporting surface, as indicated by the rectangle 20. The first fold in the towel is accomplished by forcing the towel laterally downward along the desired fold line through a suitable slot (not shown), thereby forming a leading folded edge 21. The movement of the towel is continued to the right until the towel completely clears the slot and comes to rest on a lower supporting surface, the disposition of the folded towel at this stage in the operation being indicated at 22. The second fold is accomplished in the same manner, the towel being again forced laterally downward along a desired fold line through a second suitable slot to form a leading folded edge 23. The towel is moved laterally on a new low level until the towel completely clears the second slot, the towel then having the final folded disposition indicated at 24.

It will be apparent to those skilled in the art that the path of towel movement in the course of the folding process may be varied widely from that represented by Fig. 15. The path of movement suggested by Fig. 15, however, has several advantages, including the fact that the suggested sequence of movement lends itself readily to a machine having the general character of a table in which the folding process is performed in horizontal zones just under the table top.

The mechanism shown in the drawings is supported by a frame generally designated by numeral 25, the frame including a leftward pair of legs 27, a central pair of legs 28, and a rightward pair of legs 29, the legs being interconnected by various frame members, some of which will be identified later.

The primary supporting means upon which the towel or other flexible sheet is initially spread comprises a receiving platform or table generally designated 30 that has separate sections 31 and 32 spaced to define a primary slot 35, as best shown in Fig. 3. The slot-forming edges of these two table sections are rounded to facilitate the movement of a towel through the slot, the forward section 32 being increased in thickness at the slot by a strip 36 to permit a relatively large radius of curvature at the slot. The towel or other flat article to be folded is initially placed on the primary support or receiving platform 30 with the desired first line of fold of the towel coinciding with the primary slot 35.

In accordance with my basic conception I provide means movable against the towel along this line of fold to force the towel laterally downwardly through the slot 35 until the towel completely clears the slot. While a single towel-engaging means may be employed to perform this step, I find it convenient for various reasons to employ one means to force the towel through the slot sufficiently to form a folded edge and then to utilize a second means to engage this folded edge and pull the towel to complete the movement through the slot.

In the preferred form of my invention shown in the drawings, the primary folder for initiating the movement of the towel through the slot 35 comprises a blade 38 mounted on a rectangular frame 39 carried by a rocker shaft 40, the rocker shaft being journaled in suitable bearings 41 on the rear of the frame 25. Oscillation of the rocker shaft 40 causes the blade 38 to reciprocate into and out of the primary slot 35, the range of reciprocation of the blade being such that downward movement of the blade will form in a towel the downwardly extending folded edge shown at 21 in Fig. 15. While I prefer to limit the downward movement of the primary folder, as described, it is within the purview of my invention to continue such movement until the towel is completely through the slot whereby the first fold in the towel is completed in one motion. One reason for interrupting the movement of the towel below the slot is that since I propose to confine the folding operation to a horizontal zone of relatively small vertical dimension, it is necessary to change the direction of the towel movement laterally below the slot 35. The mechanical problem involved is simplified if one means is employed to force the towel downwardly through the slot an initial distance and a second means movable laterally is utilized to complete the passage of the towel through the slot.

After the initial movement of the towel through the primary slot 35 accomplished by the primary folder 38, the downwardly extending folded edge 21 of the towel is engaged by a primary puller generally designated 44 that draws the towel laterally in a folding zone lying between the primary support or receiving platform 30 and a lower secondary support 45. To facilitate engagement of the towel by the primary puller 44, I prefer to incorporate in my apparatus a primary lift plate 46 to perform the function of feeding the folded edge portion 21 of the towel to the primary puller 44. The primary lift plate 46 is carried by a rocker shaft 47 under the rear edge of the slot 35, the plate being actuated to move downwardly as the primary folder blade 38 passes into the slot and to move upwardly as the folding blade withdraws from the slot, the upward movement of the lift plate flexing the folded towel into the operative level of the primary puller 44. The lower swinging edge of the lift plate 46 is recessed or cut away at various points to clear certain towel-gripping means incorporated in the primary puller 44, these recesses being similar to recesses 75 that will be noted in the later description of a secondary lift plate (Figs. 7 and 8).

The primary puller may comprise a plurality of grippers generally designated 50 mounted on an elongated carriage 51 that reciprocates between a rearward position near the slot 35 and a second position toward the front of the machine. The construction of the primary puller 44 will be broadly described at this point, but a more detailed understanding may be had by referring to the subsequent description of a secondary puller (see Figs. 7 to 9).

The carriage 51 of the primary puller is hollow and is movably supported at each end by a roller 52 (Figs 2 and 6), each of the rollers being adapted to traverse a slightly inclined channel-shaped track 53. For actuation the carriage 51 may be connected to rack bars 54 at each end thereof and the rack bars engaged with complementary pinions 55. The two pinions 55 are carried by a suitable shaft 56 that is journaled in bearings 57 towards the rear of the machine frame.

Extending downwardly from the carriage 51 is a trigger 58. On the forward movement of the carriage towards the position shown in Fig. 3, the trigger 58 encounters a stop 59 that is adjustably mounted on a stop rod 60, the encounter with the stop 59 "cocking" the trigger and opening the grippers 50 to the position indicated in Fig. 3. In the subsequent rearward movement of the reciprocating carriage 51 the trigger 58 clears the stop 59 but encounters a second stop 61 adjustably mounted on the stop rod 60 and is thereby tripped to cause the grippers 50 to close upon the folded edge of the towel that is presented to the grippers by the aforementioned primary lift plate 46. On the subsequent forward movement of the carriage 51, after the towel is drawn forward clear of both the slot 35 and the primary lift plate the grippers 50 are opened automatically to release the towel, and the towel with its first fold completed is dropped upon the secondary support 45. At this point in the operation of the machine, the towel has the disposition indicated at 22 in Fig. 15.

The secondary support 45 has the character of a shelf and in the same manner as the receiving platform 30 is divided into two sections separated to form a secondary slot 64 which is perpendicular to the disposition of the primary slot 35, since the second fold of the towel is to be perpendicular to the first fold.

The secondary folder may comprise a bar 65 unitary with a pair of arms 66 that are fixed radially to a rocker shaft 67, the rocker shaft being journaled in suitable bearings 68 that are attached to the underside of the receiving platform 30. The secondary folder actuated by the rocker shaft 67 oscillates between an upper position shown in full lines in Fig. 7 and a lower position indicated by dotted lines. The downward movement of the secondary folder against a folded towel on the secondary support 45 forces the towel laterally downward through the secondary slot to form a folded edge 23. For the same reasons as heretofore stated, I prefer to employ a second means to grip the folded edge 23 for the purpose of completing the movement of the towel through the slot, this means being a secondary puller generally designated by numeral 70 best shown in Figs. 6 to 9.

Figure 2:
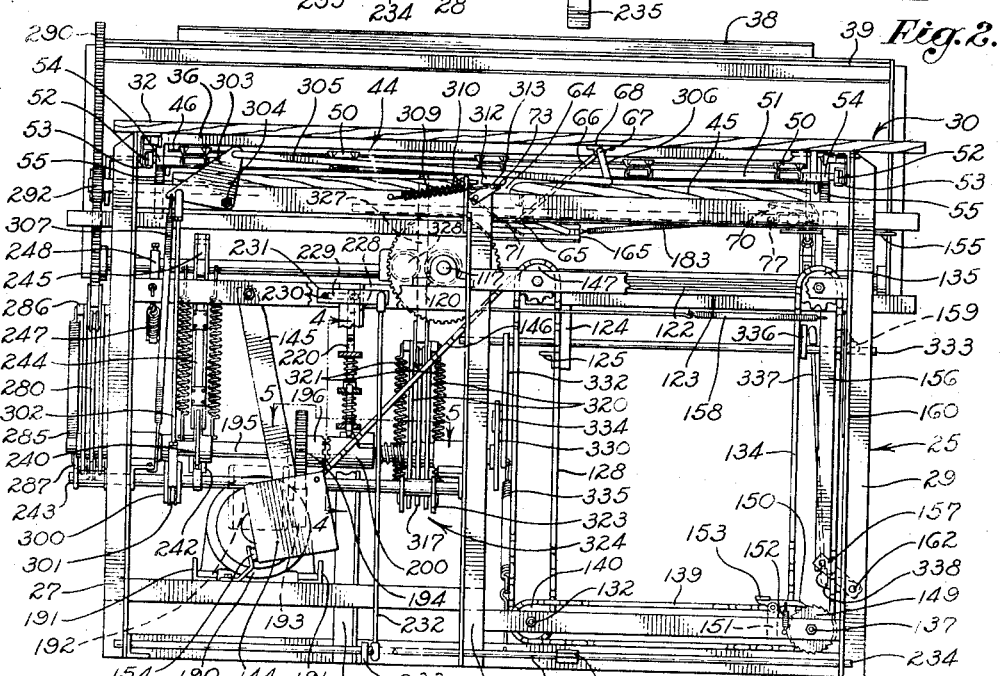
Fig. 2 is a front elevation of Fig. 1.
Figure 2A:
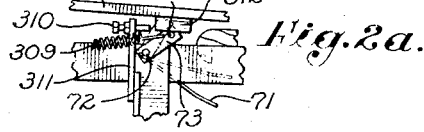
Fig. 2a is an enlarged detail taken from Fig. 2.

Preferably, a secondary lift plate 71 is employed to lift the folded portion 23 of the towel into position for engagement by the secondary puller. This secondary lift plate is shown mounted on a rocker shaft 72 that is controlled through the medium of a rocker arm 73 (Fig. 2). The swinging edge of the secondary lift plate 71 is, by preference, cut away to provide a recess or notch 75 (Fig. 8) to avoid interference with the action of the secondary puller 70.

The secondary puller 70 includes a plurality of grippers 77 on a reciprocating carriage 78. The body of the carriage 78 may be formed, as shown in the drawings, by bottom plate 79 and an upper channel-shaped plate 80, the two plates forming a unitary member having a leftward flange or step 81 and a rightward step or flange 82. The two ends of the carriage 78 are attached respectively to rack bars 83 and are supported by rollers 84 connected in turn to the rack bars. The roller 84 at each end of the reciprocating carriage engages a channel-shaped track 85 having a small guide rail 86. The track 85 may be attached to the machine frame in any suitable manner, the drawings showing, by way of example, a bracket 87 interconnecting the track and an angle-iron frame member 88.

The leftward flange or step 81 of the reciprocating carriage 78 may serve as the lower jaw for each of the plurality of grippers 77, there being for each of the grippers a lower gripper member 90 of rubber or other suitable material mounted on the leftward flange 81 of the carriage. Each of the grippers 77 includes an upper jaw 92 carrying a second resilient gripper member 93 positioned to cooperate with the lower gripper member 90. The upper jaw 92 of each of the grippers may be of sheet metal construction having downwardly extending ears 94 engaging a hinge pin 95, the hinge pin being carried by a bracket 96 mounted on the rightward flange 82 of the reciprocating carriage. Each of the upper jaws 92 is continuously urged towards closed position by a suitable helical spring 97 acting between the body of the carriage 78 and one of a pair of ears 98 on the jaw.

Within the carriage 78 and extending lengthwise thereof, a gripper-control shaft 100 is rotatably confined by the two plates of the carriage, a series of screws 101 interconnecting the plates and an angle member 102 within the carriage spaced from the screws 101. Extending radially from the shaft 100 beneath each of the upper gripper jaws 92 is a short arm 103 that carries a terminal roller 104, there being a slot 105 in the upper plate 80 of the carriage to permit the arm 103 to swing upwardly against the jaw member 92. At one end of the carriage, as best shown in Figs. 7, 8, and 9, is a trigger 108 in the form of a pin extending radially from the gripper-control shaft 100 through a suitable slot 109 in the upper carriage plate. Toward the end of the leftward movement of the reciprocating carriage 78, the trigger 108 encounters a stop 110 which causes the trigger through the medium of the gripper-control shaft 100 to swing each of the arms 103 towards the right, thereby permitting the grippers 77 to close on the folded edge portion 23 of the towel. Rightward movement of the carriage 78 draws the towel completely through the secondary slot 64. Towards the end of the rightward movement of the carriage, the trigger 108 encounters a second stop 114 and is moved leftward to rotate the gripper-control shaft 100 counter-clockwise, the counter-clockwise movement of the shaft causing each of the arms 103 to swing upward to lift the upper jaws 92, the gripper then being in "cocked" disposition, as indicated by dotted lines in Fig. 7. The stop 114 may be simply an angular member secured to the machine frame by suitable screws 115.

For actuation of the reciprocating carriage 78, the two rack bars 83 associated therewith engage respectively two gears 116 that are keyed to a shaft 117. The shaft 117 is journaled in suitable bearings 118 and carries a driving pinion 120.

The completely folded towels as they are successively released by the secondary puller 70 form a stack 122 on a stacking platform 123. Since I find it desirable to have the top of the stack 122 at substantially a constant level as each successive folded towel is received thereon, I arrange for the stacking platform 123 to be movable vertically. In the construction suggested by the drawings, the stacking platform 123 is supported by four vertical arms 124, the two leftward arms 124 being connected to a cross bar 125 and the two rightward arms 124 being connected to a second cross bar 126 to the right. The ends of the left cross bar 125 are connected in turn by bolts 127 to corresponding continuous sprocket chains 128, there being one sprocket chain towards the front of the machine and one towards the rear, as indicated diagrammatically in Fig. 18. The two continuous sprocket chains 128 are in vertical disposition extending between corresponding upper sprockets 130 and lower sprockets 131, the two lower sprockets 131 being keyed to a common shaft 132. In similar manner the cross bar 126 is connected by bolts 133 at each of its ends to a pair of vertically disposed continuous sprocket chains 134. The sprocket chains 134 extend between upper sprockets 135 and lower sprockets 136, the lower sprockets being keyed to a common shaft 137. A horizontally disposed continuous sprocket chain 139 interconnects a sprocket 140 keyed to the shaft 132 and a sprocket 141 keyed to the shaft 137, thereby interlocking the four vertically disposed sprocket chains so that the four arms 124 supporting the stacking platform 123 rise and fall together to maintain the platform in substantially horizontal disposition at all times.

To counterbalance the stacking platform 123, I mount a counterweight 144 adjustably on a pivoted counterweight arm 145 and connect either the counterweight or the counterweight arm with the described mechanism for supporting the stacking platform. For example, a sprocket chain 146 may extend from the counterweight 144 over an upper sprocket 147 that is coaxial with one of the upper sprockets 130, the sprocket chain 146 continuing downward to connection by a bolt 148 (Fig. 3) with the leftward cross bar 125. A feature of this arrangement is that the greater the number of towels supported by the stacking platform as the stacking platform moves downwardly, the greater the counterbalancing force exerted through the sprocket chain 146.

For reasons that will become apparent, I prefer to overbalance the weight of the loaded stacking platform to provide a tendency for the platform at all times to move toward its uppermost position against a limiting stop, and to provide a suitable detent mechanism that will normally prevent such upward movement of the stacking platform but will freely permit downward movement. Such a detent mechanism may comprise, for example, a ratchet wheel 149 keyed to the shaft 137 and normally engaged by a pawl 150 that is pivotally mounted on a suitable bracket 151. The pawl is normally pulled downwardly into engagement with the ratchet wheel by a suitable spring 152, but is provided with a pedal portion 153 by means of which the pawl may be lifted to permit the stacking platform to be moved upward by the counterweight. The stop for limiting the upward movement of the stacking platform may comprise a finger 154 in the path of the counterweight 144.

A feature of my invention is the conception of the combination with such a movably mounted stacking platform of means movable downwardly against the top of the stack to depress the stacking platform after each folded towel is deposited on the stack, whereby the top of the stack is at substantially the same level to receive each successive towel. A stack depresser for this purpose may include a depresser plate 155 carried by a pair of upstanding arms 156 that are pivotally mounted at their lower ends on a pair of corresponding rocker arms 157. Normally a suitable spring means 158 connected with one or each of the arms 156 tends to swing the arms and thereby the depresser plate 155 to the left (Fig. 6), the action of the spring being limited by suitable stop means such as a stop roller 159 positioned to move against a corresponding vertically disposed stop plate 160 mounted on the machine frame. Roller means is employed for the stop to minimize friction when the depresser plate is moved vertically by rotation of a rocker shaft 162 on which the rocker arms 157 are mounted.

When the carriage 78 of the secondary puller 70 nears the end of its rightward movement, it moves against the upper ends of the arms 156 to swing the depresser plate to the right and out of the way until the currently completed towel is dropped onto the stack 122. The subsequent return movement of the carriage 78 permits the stack-depresser assembly to return to normal disposition under the force of the spring means 158, the depresser plate 155 then being above the stack of towels. Before the next towel is deposited on the stack, the rocker shaft 162 is oscillated to depress the stack to the desired receiving level.

Since the towel in process is only partially supported as the secondary puller nears the end of its rightward movement, the towel may tend to drag across the stack 122 and to disarrange the uppermost towel thereon. In the preferred form of my invention, therefore, I provide a reciprocating tray to support the towel in cooperation with the secondary puller.

Figure 16:
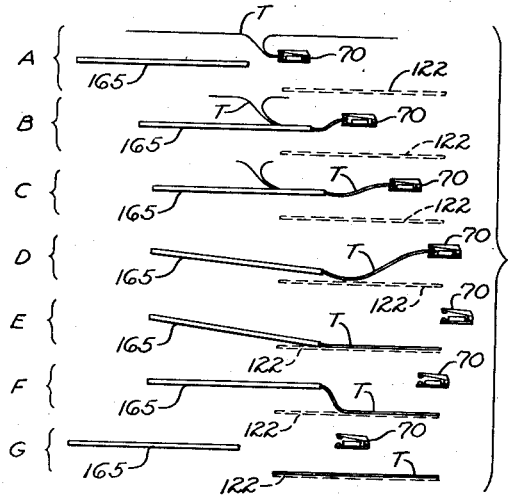
Fig. 16 is a digrammatic view showing the movements of a tray and associated mechanism in delivering a finished folded towel to a stack.

A suggested action for such a reciprocating tray with relation to the secondary puller and the stack of finished towels may be understood by referring to Fig. 16 that shows diagrammatically the cycle of operation. At stage A of the cycle, when the secondary puller 70 is at its extreme leftward position and has just gripped the folded edge of a towel T, the tray 165 is at its extreme leftward position. The tray 165 moves to the right simultaneously with the secondary puller 70 until the position is reached that is indicated by stage B, portions of the towel T coming to rest on the tray during this period. Between stage B and stage C of Fig. 16, the tray is stationary, while the secondary puller continuing to move to the right drags the towel T across the tray. Between stages C and D, the tray pauses but tilts downwardly towards the stack 122 as the secondary puller 70 reaches its extreme rightward position and drops the leading end of the towel T on the stack. The stage E shows the puller at its extreme rightward position with a rightward portion of the towel T resting on the stack 122 and a leftward or trailing portion of the towel resting on the inclined tray 165. In the initial movement of the puller in the reverse direction to the left, the tray rotates to its normal substantially horizontal disposition, the relative position of the elements then being as indicated at stage F. Between stage F and stage G, the tray moves to the left simultaneously with the leftward movement of the secondary puller 70, and between stage G and stage A at the beginning of the next cycle, the tray remains stationary while the puller continues its leftward movement. It is apparent that such a tray may have its own separate actuating mechanism timed to operate in the sequence indicated, but I prefer to operatively interconnect the tray and the secondary puller in a manner to provide the required action, as will now be described.

The tray 165 is supported towards its left end, as indicated in Figs. 3 and 6, by a cross bar 166, the cross bar being supported in turn by rollers 167 mounted on each of its ends. The rollers 167 engage corresponding channel-shaped tracks 168 that are in substantially horizontal disposition below the level of the rack bars 83 that control the secondary puller 70. A stop 170 in the form of a block mounted in one or each of the tracks 168 is in the path of the roller or rollers 167 to limit the movement of the tray to the right, as best shown in Fig. 6, and a second stop means 171 of similar construction may be provided to limit the leftward movement of the rack, as indicated by Fig. 6a.

Each of the longitudinal edges of the tray 165 is provided with a pair of spaced guide rails 172 between which and in sliding engagement therewith is mounted a suitable slide block 173. As best shown in Figs. 12 and 13, each of the two slide blocks is provided with friction shoes 174 mounted in suitable bores 175 and continuously urged against one of the rails 172 by confined spring means 176. A pair of links 179, one link lying to each side of each slide block 173, is pivotally connected by a pin 180 to the corresponding rack bar 83 and by a pin 181 to the slide block 173. By this arrangement the links 179 cooperate with the guide rails 172 to confine the slide block 173. A suitable helical spring 183 is connected to either each of the pairs of links 179 or to each slide block 173. For example, each spring 183 may be connected to a slide block 173, as shown in the drawings, the other end of the spring being connected to the carriage 78 of the secondary puller. The action of the springs 183 is limited by pins 184 on the rack that serve as stops for swinging movement of the links 179, the tray 165 being substantially horizontal when the links are drawn against the pins 184, as indicated in Fig. 6.

The arrangement described functions in the following manner to provide the sequence of tray movement depicted in Fig. 16. At stage A in the sequence, the secondary puller is at its extreme leftward position, the rollers 167 of the tray are against the left stop means 171, and the slide block 173 is at the extreme left end of the two guide rails 172. As the secondary puller initially moves rightward to the disposition of stage B, the frictional engagement of the slide block 173 with the corresponding guide rails is sufficient to cause the tray to follow the movement of the secondary puller as the slide blocks are drawn rightward through the medium of the springs 183. At stage B the stops 170 are encountered by the tray rollers 167 to prevent further rightward movement of the tray. The rack bars 83 that drive the secondary puller continue to move rightwardly, however, and with the tray stationary the slide blocks 173 slide along the guide rails 172 until at stage C the slide blocks encounter stops 185 (Fig. 12) at the rightward ends of the guide rails 172. Subsequent rightward movement of the secondary puller rack bars 83 causes the links 179 to be rotated in a manner to tilt the rightward end of the tray downward in opposition to the force of the springs 183, the position of the tray at stage D being indicated in dotted lines in Fig. 6. At the end of the rightward movement of the secondary puller, stage E of Fig. 16, the leading end of the folded towel has been dropped upon the stack 122 and the trailing end rests upon the inclined tray 165.

During the initial part of the reverse or leftward movement of the secondary puller rack bars 83, the links 179 are rotated upward to permit the springs 183 to return the tray to its normal horizontal disposition. The towel readily slides off the tray, in the first place, because only a portion of the towel is on the tray, and, in the second place, because the tray is relatively smooth, whereas the towel tends to cling to the towel of the stack on which it rests. At stage F the tray begins to move leftward because of frictional engagement with the guide rails 172 by the slide blocks 173, but at stage G the tray rollers 167 encounter the rearward stop means 171 to hold the tray stationary. Continued movement leftward by the secondary puller causes the slide blocks 173 to move to the left end of the slide rails 172, thus bringing the tray and secondary puller back to stage A for a repetition of the cycle.

It is to be noted that the depresser plate 155, acting on the stack of towels in the course of each of the above cycles of tray operation, serves to maintain the top of the stack at substantially the same level as each of the successive towels is deposited thereon. The cooperation of the various members results in a neat and uniform stack of finished towels. When the stacking platform 123 approaches its lowermost limit of movement, if not before, the stack of towels is removed and the pedal 153 is depressed to permit the stacking platform to move upwardly to a suitable position to receive the initial towel for a new stack.

Figure 17:
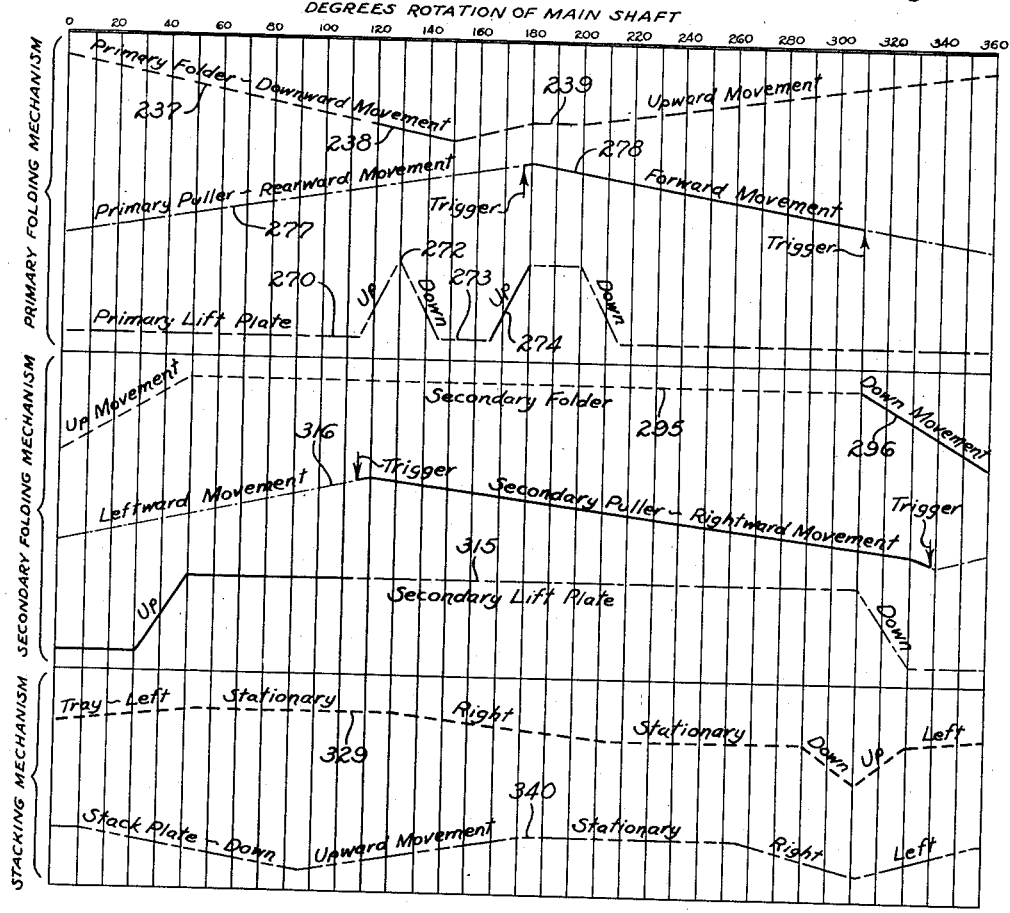
Fig. 17 is a graph to indicate the movements of various elements in my apparatus, the movements being indicated relative to degrees of rotation of a main shaft.

Those skilled in the art will readily appreciate that various forms of interlocking actuating mechanisms may be employed to operate the moving parts described above in a sequence to practice my method of folding. In the preferred form of my invention the folding operation, as a whole, is divided into two stages that are carried out concurrently in one machine cycle, there being normally two successive towels in process in the machine simultaneously. Attention is directed to Fig. 17 showing graphically the sequence of machine movement in terms of rotation of the main shaft 195, broken lines representing movements that are ineffective in the actual folding procedure and full lines representing movements acting upon a towel in furthering the folding procedure. A mechanism suggested as suitable for actuating the various machine parts will now be described in the light of this graph.

As best shown in Figs. 2 and 3, a motor 190 supported by frame members 191 operates through a speed reduction device 192, a driving pinion 193 that meshes with a driven pinion 194. The pinion 194 is mounted on a drive shaft 195 for rotation independently thereof and is provided with a clutch sleeve 196 having clutch teeth 197. Keyed to the drive shaft 195 is a slidable clutch sleeve 200 having teeth 201 adapted to mesh with the teeth of the first-mentioned clutch sleeve 196, the clutch sleeve 200 being continuously urged towards such engagement by a suitable spring 202 embracing the drive shaft 195 between the clutch sleeve 200 and a collar 203. The clutch sleeve 200 has a reduced peripheral portion 204 and an enlarged peripheral portion 205, the edge of the enlarged peripheral portion forming an inclined cam shoulder 206 that terminates in a stop shoulder 207.

Directly above the clutch sleeve 200 is a bracket 208 secured to a frame member 209 by suitable bolts 210, the bracket having vertically spaced arms 211, 212, and 213. Slidingly mounted in the two lower arms 211 and 212 of the bracket is a clutch pin 215 having a stop collar 216 normally abutting the arm 211, the clutch pin being urged continuously downwardly by a helical spring 217 embracing the pin between the stop collar and the arm 212. The clutch pin 215 normally engages both the cam shoulder 206 and the stop shoulder 207 of the clutch sleeve 200, thereby holding the clutch sleeve 200 stationary, out of engagement with the clutch sleeve 196, as shown in Figs. 4 and 5.

Slidingly mounted in suitable apertures in the upper two arms 212 and 213 of the bracket 208 is a release plunger 220 that is continuously urged downwardly by a spring 221 embracing the plunger between the upper arm 213 and a stop collar 222 on the plunger, the stop collar normally resting against the arm 212. Pivoted to the lower end of the release plunger 220 is a trip arm 223 that extends through a guide slot 224 in the bracket arm 211. The trip arm 223 has a shoulder or tooth 225 adapted to engage the stop collar 216 to raise the clutch pin 215. The trip arm 223 normally is held against the reduced peripheral portion 204 of the clutch sleeve 200 by the action of a spring 226 that interconnects the lower end of the trip arm and the frame member 209, the tooth 225 at this position of the trip arm being under and in engagement with the stop collar 216 of the clutch pin.

The release plunger 220 is operatively connected by a link 228 with a rocker arm indicated by dotted lines at 229 in Fig. 2, the arm being mounted on the end of a rocker shaft 230. The rocker shaft 230 is actuated by a rocker arm 231 that in turn is actuated through a link 232 from a rocker arm 233 near the bottom of the machine. The rocker arm 233 is mounted on a rocker shaft 234 that is controlled by a clutch pedal 235. In the inactive position of the clutch control mechanism the clutch pedal 235 is held in elevated disposition by the action of the spring 226 associated with the release plunger 220, the normal disposition of the clutch mechanism being shown in full lines in Fig. 4 and in Fig. 5.

Whenever the clutch pedal 235 is depressed to elevate the release plunger 220, the tooth 225 of the trip arm 223 lifts the clutch pin 215 to release the clutch sleeve 220 whereupon the spring 202 forces the clutch sleeve 200 into operative engagement with the clutch sleeve 196. The drive shaft 195 being operatively connected with the motor 190 rotates in a clockwise direction, as viewed in Figs. 3 and 4, and the resultant rotation of the clutch sleeve 200 brings the enlarged peripheral portion 205 of the clutch sleeve against the trip arm 223 to move that arm to the left sufficiently, as indicated in dotted lines in Fig. 4, to displace the tooth 225 from the clutch pin collar 216, whereupon the clutch pin is released to drop towards its normal disposition in the path of the stop shoulder 227 of the clutch sleeve 200. Because of this clutch arrangement, the clutch will remain in driving engagement only for a sufficient period to cause the drive shaft 195 to make a single rotation, it being necessary to release the clutch pedal 235 and to subsequently depress the clutch pedal to cause the drive shaft to make a second rotation. One rotation of the drive shaft 195 is indicated in degrees in Fig. 17, the 360° representing one complete machine cycle.

I contemplate having the primary folder swing downwardly in the course of a machine cycle sufficiently to pass the blade 38 into the primary slot 35 and then to return to the raised position at the end of the machine cycle. For example, the movement of the primary folder may be such as indicated by the line 237 in Fig. 17, the solid portion 238 of the line indicating the time interval during which the blade 38 is forcing the towel laterally downward through the primary slot 35. In the upward movement of the primary folder there is preferably a short pause as indicated by the horizontal portion 239 of the line, the purpose of this pause relating to the primary lift plate, as will be apparent below.

To provide movement of the character indicated by the line 237 in Fig. 17, I mount a cam 240 on the drive shaft 195, the cam being in the form of a plate cut to the required configuration. The periphery of the cam 240 is engaged from below by a follower in the form of a roller 241 journaled between two parallel bars that constitute an arm 242. The arm 242 is pivoted on a fixed shaft 243 and the swinging end of the arm is connected by a link 244 with a rocker arm 245 that operates the previously mentioned rocker shaft 40 for the primary folder. A helical spring 247 connected at one end to the frame of the machine and at the opposite end to a rocker arm 248 extending from the rocker shaft 40 serves to urge the rocker shaft continuously in a direction to rotate the rectangular frame 39 of the primary folder towards the rearward and upward position thereof. It is apparent that the effect of the spring 247 is to force the roller 241 continuously against the underside of the cam 240.

Since it is possible for an operator's hand to be caught under the primary folder blade 38 as the blade moves into the primary slot 35, I prefer to arrange for the primary folder to be operated in a yielding manner whereby the movement of the primary folder may be stopped by the operator's hand without exerting injurious force. The desired effect may be obtained, for example, by making the link 244 yieldingly extensile. Thus, I propose to have the link comprise two sections telescoped for sliding action, as best shown in Figs. 10 and 11. The upper section of the link 244 comprises a pair of spaced bars 250 interconnected by spaced pairs of small plates 251, the bars and plates slidingly embracing an intermediate bar 252 that constitutes the lower section of the link. The two sections of the link may be yieldingly interconnected by a pair of helical springs 253 that are connected at their upper ends to a cross pin 254 in the spaced bars 250 and are connected at their lower ends to a cross pin 255 in the bar 252. Normally, the springs 253 hold the extensile link 244 in contracted disposition, the contraction of the link being limited by a suitable stop plate 256 that is held by a nut 257 on the lower pin 255, the stop plate abutting the lower end of one of the spaced bars 250. If there is any abnormal resistance to the downward movement of the primary folder, the link 244 will yield longitudinally, the range of extension of the link being at least sufficient to permit the primary folder blade 38 to stop just above the primary slot.

While the primary lift plate 46 may be actuated directly from the drive shaft 195, I find it convenient to connect it with the rocker shaft 40 of the primary folder mechanism for actuation. A cam 260 (Fig. 3) mounted on the rocker shaft 40 has two outer dwells 261 and 262 separated by an intervening valley. Cooperative with the cam 260 is a yoke 263 that includes two rectangular frames 264 carrying a cam follower in the form of a roller 265. The two rectangular frames 240 lie on opposite sides of the cam 260 and slidingly engage the rocker shaft 40. A rod 266 extending from the yoke 263 and unitary therewith is connected with a rocker arm 267 that controls the previously mentioned rocker shaft 47 on which the primary lift plate 46 is mounted. A spring 268 interconnecting the yoke 263 and the frame of the machine continuously urges the yoke upward and to the right, as viewed in Fig. 3, the action of the spring tending to swing the primary lift plate 46 upwardly and also tending to hold the roller 265 against the cam 260.

The proposed movement of the primary lift plate 46, as determined by the above described mechanism, is indicated by the line 270 in Fig. 17. At the beginning of the machine cycle, the roller 260 is riding against the outer dwell 261 of the cam 260, thereby holding the primary lift plate at its lower position in opposition to the spring 268, all of which may be understood by referring to Fig. 3. Rotation of the cam 260 in clockwise direction permits the roller 265 to traverse the valley between the two walls of the cam, thereby causing the primary lift plate to move up and down, as indicated by the peak 272 in the line 270. This particular oscillation of the lift plate is of no service in the folding operation; the important fact is that the lift plate pauses at its lower position for an interval indicated by the horizontal portion 273 of the line 270, this interval occurring while the primary folder 44 completes its downward movement and then retreats upwardly. The folded edge portion 21 of the towel (Fig. 15) formed by the downward movement of the primary folder now comes to rest on the primary lift plate 46, as indicated by the beginning of the solid portion 274 of the line 270, the roller 265 at this juncture being against the second outer dwell 262 of the cam 260.

The rearward movement of the primary folder 44 and the concurrent reverse movement of the cam 260 permit the roller 265 to enter the valley between the two outer dwells 261 and 262 of the cam, at which point the roller 265 pauses because the primary folder pauses at this time as previously mentioned with reference to the horizontal portion 239 of line 237. It is apparent then that after the primary folder begins its upward movement, the primary lift plate automatically lifts or deflects upwardly the folded edge portion 21 of the towel, and then pauses with the towel held in a disposition to be fed to the primary puller 44. The subsequent rotation of the cam 260 as the primary folder resumes its rearward movement forces the roller 265 outwardly onto the outer dwell 261 of the cam thereby depressing the lift plate for the remainder of the machine cycle.

During the first half of the machine cycle, the primary puller 44 moves to the leftward, until at the end of such movement the trigger 58 is tripped to cause the grippers 50 on the carriage 51 to close into engagement with the folded edge portion 21 of the towel, the towel being supported at this juncture on the elevated lift plate 46. The rearward movement of the primary puller carries the towel forwardly to clear the primary slot as indicated by the solid portion 277 of the line 278, the towel being dropped from the grippers when the trigger 58 strikes its forward stop.

To actuate the primary puller 44 in a manner corresponding to the line 278 of the graph, I provide a cam 280 on the drive shaft 195, the cam being in the form of a plate cut to the required configuration, as best shown in Fig. 14. Cooperative with the cam 280 is a yoke generally designated 281 that incorporates a pair of guide arms 282 on each side of the cam, each pair of guide arms slidingly engaging the drive shaft 195 or a suitable sleeve on the drive shaft. Journaled in the yoke 281 is a cam follower in the form of a roller 284 that rides upon the peripheral edge of the cam 280. To force the follower 284 downwardly against the cam at all positions of the cam, a pair of springs 285 are connected to corresponding arms 286 integral with the yoke, the lower ends of the springs being connected to a corresponding pair of arms 287 that are pivoted to the fixed shaft 243. The lower arms 287 carry a roller 289 therebetween that at all times engages the periphery of the cam 280 from below. It will be apparent that the spring 285, in effect, operates in tension between the upper roller 284 and the lower roller 289 to cause the upper roller to follow the cam at all times.

Extending upwardly from the yoke 281 as a unitary part thereof is a rack arm 290 that meshes with a pinion 292 (Fig. 3) keyed to the previously mentioned shaft 56 that controls the action of the primary puller 44. The rack arm 290 is held against the pinion 292 in engagement therewith by an adjacent guide roller 294 having a grooved periphery that engages the rack arm. It will be apparent that the combined yoke and rack arm will reciprocate in a rectilinear path by virtue of the fact that the lower end of the combination is guided by the drive shaft 195 and the upper end of the combination is guided by the pinion 292 cooperating with the guide roller 294.

The action of the secondary folder 65 as indicated by the line 295 of the graph may be such that near the end of the machine cycle the secondary folder moves downwardly after the towel is released by the primary puller and forces the towel through the secondary slot, the secondary folder acting on the towel during the period represented by the solid portion 296 of the line 295.

For actuation of the secondary folder in the manner suggested, I provide a cam 298 on the drive shaft 195 to cooperate with a rocking lever 300. The rocking lever shown in the drawings constitutes a pair of parallel bars fulcrumed on the previously mentioned shaft 243, the rear end of the lever carrying a roller 301 in constant contact with the cam 298 and the forward end of the lever being pivotally connected to a link 302. The upper end of the link 302 (Fig. 2) is connected to an arm of a bell crank 303 that is pivoted on a spindle 304. The particular bell crank shown is simply a triangular plate. The second arm of the bell crank 303 is connected by a link 305 with a rocker arm 306 carried by the previously mentioned rocker shaft 67 that controls the secondary folder. A suitable spring 307 interconnecting the frame of the machine and the bell crank 303 pulls downwardly on the bell crank to hold the roller 301 against the cam 298, the spring thereby tending to swing the secondary folder upwardly as permitted by the cam. The cam is shaped to cause the secondary puller to rise at the initiation of the machine cycle and to remain elevated until after the primary puller releases the towel to the secondary support 45.

Since the secondary lift plate 71 is adjacent the secondary folder 65, I find it convenient to operatively associate the lift plate with the above described mechanism that actuates the secondary folder. To this end I connect a spring 309 with the previously mentioned rocker arm 73 that controls the lift plate rocker shaft 72, the spring having one end anchored to the machine frame and being disposed to cause the lift plate 71 to swing upwardly. The uppermost position of the lift plate may be adjustably fixed by a set screw 310 in a plate 311 on the machine frame, the set screw being positioned to block the counterclockwise rotation of the rocker arm 73 as viewed in Fig. 2. The link 305 of the secondary folder mechanism carries a downwardly projecting cam-shoe 213 that is carried into and out of engagement with a cam pin 313 on the rocker arm 73, thereby depressing and releasing the rocker arm to depress and raise the secondary lift plate 71.

The shape and disposition of the cam shoe 312 are such as to actuate the secondary lift plate in the manner represented by the line 315 in the graph. At the beginning of the machine cycle the secondary lift plate is depressed by engagement of the cam shoe 312 with the pin 313, the cam shoe at this time being in the act of moving leftward as the secondary folder is being swung upward. The folded edge portion 23 of the towel rests upon the stationary secondary lift plate as indicated in the graph by the fact that the line 315 has an initial solid portion in horizontal disposition. As the pin 313 escapes from the cam shoe 312 in the latter part of the upward movement of the secondary folder, the secondary lift plate is forced upwardly by the spring 309, thereby lifting up the folded edge of the towel for feeding to the secondary puller 70.

The desired action of the secondary puller 70 is indicated by the line 316 of the graph. During the initial portion of the machine cycle, the secondary puller is moving leftward and the trigger 108 is tripped as the limit of leftward movement is reached, whereupon the secondary puller grips the towel and draws it to the right to clear the secondary slot. The graph shows the line 316 as solid along the portion between the two points at which the trigger 108 is acted upon by the stops 110 and 114. Before the end of the machine cycle, the return movement of the secondary puller is initiated.

Such actuation of the secondary puller 70 may be achieved by providing a cam 317 (Figs. 3 and 14) on the drive shaft 195 to cooperate with associated mechanism in the same manner as the cam 280 that controls the primary puller. A yoke 318 (Fig. 2) carrying a roller 319 acting against the cam 317 from above has a pair of arms 320 extending downwardly on each side of the cam in sliding engagement with the drive shaft 195 or a suitable sleeve thereon. The yoke 318 is continuously urged downwardly by a pair of springs 321 that have their upper ends connected with the yoke and their lower ends secured to corresponding parallel bars 323 that constitute an arm 324 pivoted to the previously mentioned shaft 243. The arm 324 carries a roller (not shown) positioned under the cam 317, corresponding in function to the previously mentioned lower roller 289 associated with cam 280, so that the springs hold the roller 319 down against the cam.

The yoke 318 has a rack bar 327 unitary therewith extending upwardly into mesh with the previously mentioned pinion 120 (Fig. 6) that drives the secondary puller. A guide roller 328 holding the rack bar in mesh with the pinion 120 cooperates with the pinion to guide the upper end of the combined yoke and rack bar.

Since the tray 165 is operated by movement of the secondary puller 70, as heretofore described, the sequence of tray movements will fall in the order indicated by notations along the line 329 of Fig. 17.

The mechanism for actuating the stack-depressing mechanism previously described may start with a cam 330 (Figs. 2 and 3) on the drive shaft 195. An arm 332 that actuates a rocker shaft 333 carries at an intermediate point thereon a roller 334 that follows the periphery of the cam 330, the roller being pressed continuously against the cam by a suitable spring 335 connecting the swinging end of the arm 332 and the machine frame. The rocker shaft 333 carries a second rocker arm 336 that is connected by a link 337 with a rocker arm 338. The rocker arm 338 is on the previously mentioned rocker shaft 162 that controls the vertical movements of the stack-depresser assembly. The various movements of the depresser plate 155 relative to the machine cycle are represented by the line 340 in Fig. 17.

It will be apparent to those skilled in the art that the basis of the described machine is a fundamental conception of a new method of folding towels and the like that is independent of any particular machine and may be performed by various mechanisms. While the method as practiced herein involves forcing a sheet through a slot, in other practices such forcing may be dispensed with, especially when the path of towels in process need not be confined to the compact space of the machine herein described. As an example of how my method may be practiced without employing the edges of a slot to cooperate in the folding process, Fig. 19 shows schematically how a towel may be folded simply by lifting it from a horizontal plane by a member extending along the desired line of fold of the towel, the towel being lifted until the portions on opposite sides of the fold line are juxtaposed.

At the beginning of the folding process shown in Fig. 19, the unfolded towel 345 rests upon two substantially horizontal support members 346 spaced to define a slot 347. Initially, a pair of arms 348 and 349 that carry respectively folding bars 350 and 351 are disposed below the support members 346. The arms 348 and 349 are carried in turn by stub shafts 353 and 354 respectively that are slidingly keyed in a hollow drive shaft 355. Both the arms have the same angular relation to the drive shaft 355 so that the folding bars 350 and 351 are always in alignment with each other. At the beginning of the folding process, the ends of the two folding bars 350 and 351 are close together so that two bars, in effect, constitute a single bar.

Clockwise rotation of the drive shaft 355 rotates the arms 348 and 349 to carry the folding bars 350 and 351 upwardly through the slot 347. The two folding bars 350 and 351 move against the under side of the towel 345 along the desired fold line of the towel and carry the towel upwardly until the portions lying to either side of the fold line are draped against each other, the disposition of the towel at this juncture being shown at 356. Continued rotation of the arms 348 and 349 leads the folded towel onto an elevated second pair of support members 358 and 359 that define a second slot 360. At this point in the operation, the drive shaft 355 pauses in its rotation momentarily while the two stub shafts 353 and 354 slide away from each other axially until the two folding bars 350 and 351 are entirely withdrawn from the towel, leaving the towel in the disposition shown at 361. The two arms 348 and 349 are then rotated back to the starting position.

The second fold is accomplished in substantially the same manner as the first fold by a pair of arms 363 and 364 that carry respectively a pair of cooperating folding bars 365 and 366. The two arms 363 and 364 are carried in the same manner as heretofore described by a pair of axially slidable stub shafts 367 and 368 that are keyed in a second hollow drive shaft 370. The two arms 363 and 364 swinging the bars 365 and 366 upwardly through the slot 360 engage the towel from below along a second fold line and the towel becomes draped on opposite sides of the coacting folding bars in the manner previously described. The towel is swung upwardly across a suitably curved apron 371 onto a receiving platform 372 whereupon the two folding bars 365 and 366 move axially out of engagement with the towel, leaving the completely folded towel on the platform, as indicated at 373.

The constructions set forth herein for the purpose of disclosure and to illustrate the principles of my invention will suggest to those skilled in the art various changes, modifications, and other embodiments that do not depart from the essence of my inventive concept. I reserve the right to all such changes, modifications, and embodiments that properly come within the scope of my appended claims.

I claim as my invention:

1. In a machine of the character described, means for making a fold in a flexible sheet, said means comprising: means to support said sheet at a first level; means forming a slot under the supported sheet; reciprocating means movable downwardly against said sheet along the desired line of fold to force said sheet partially through said slot to form a leading folded edge in the sheet below said slot; means to lift said folded edge to a feed position; means movable along a second lower level to engage said folded edge at said feed position and to complete the movement of the sheet through the slot; and means to actuate said reciprocating means, said lifting means and said engaging means in timed sequence.

2. In a machine of the character described, means for making a fold in a flexible sheet, said means comprising: means to support said sheet at a first level; means to support said sheet subsequently at a second level; means forming a slot under the sheet when the sheet is on said first support; means to force said sheet laterally downwardly partially through said slot to form a leading folded edge in the sheet; gripper means movable towards and away from said slot in a path between said two support means, said gripper means being adapted to approach said leading folded edge of the sheet in an open position, to close upon said folded edge, to pull said folded edge until the sheet clears said slot, and to open thereafter to release said sheet to said second support; and means to actuate said forcing means and gripper means in timed sequence.

3. A folding machine of the character described for folding a sheet of flexible material, said machine having: a first support means providing a slot; a second lower support means providing a second slot; means operable when said sheet is on said first support to force said sheet downwardly along a desired fold line through said first slot sufficiently to form a leading folded edge in the sheet; gripper means movable towards and away from said first slot in a path between said two support means, said gripper means being adapted to approach said leading folded edge of the sheet in open position, to close upon said folded edge, to pull said folded edge until the sheet clears said slot, and to open thereafter to release said sheet to said second support; means operable when said sheet is on said second support to force said sheet downwardly along a desired second fold line through said second slot to form a second leading folded edge in the sheet; and a second gripper means movable towards and away from said second slot in a path below said second support, said second gripper means being adapted to approach said leading folded edge of the sheet in open position, to close upon said folded edge, to pull said folded edge until the sheet clears said slot, and to open thereafter to release said sheet.

4. A machine of the character described for folding a flexible sheet, said machine having in combination: means forming a slot to receive the sheet; means to force said sheet laterally along a desired fold line of the sheet through said slot and to release the folded sheet to a receiver for folded sheets; and a reciprocating tray to receive the trailing end of the folded sheet as the sheet leaves said slot.

5. A machine as set forth in claim 4 in which said tray moves in the same direction as the sheet prior to the release of the sheet and moves in the opposite direction after the release of the sheet to slide out from under said trailing end of the folded sheet.

6. A machine of the character described for folding a flexible sheet, said machine having in combination: means forming a slot to receive the sheet; means to force said sheet along a desired fold line of the sheet through said slot sufficiently to form a leading folded edge; gripper means to seize said folded edge, to pull said sheet completely through said slot and then to release the folded sheet; and a reciprocating tray to support a portion of said sheet as said gripper means moves away from said slot.

7. A machine of the character described for folding a flexible sheet, said machine having in combination: means forming a slot to receive the sheet; means to force said sheet along a desired fold line of the sheet through said slot sufficiently to form a leading folded edge; gripper means reciprocating towards and away from said slot, said gripper means being adapted to seize said folded edge, to pull said sheet completely through said slot and then to release the folded sheet; and a reciprocating tray to support a portion of said sheet as said gripper means moves away from said slot, said tray moving with said gripper means as the gripper means initially moves away from said slot, then pausing until after the gripper means initiates its return movement, and finally returning with the later part of the return movement of the gripper means.

8. A machine substantially as set forth in claim 7 in which said tray tilts downwardly during its pause period.

9. In a machine of the character described, means for making a fold in a flexible sheet, said means comprising: a first support for said sheet at a first sheet position, said support having a slot disposed to extend under the sheet from one edge of the sheet to the opposite edge of the sheet; a second support for supporting said sheet subsequently at a second position; means to force said sheet laterally downwardly partially through said slot in said first support to form a leading folded edge in the sheet; gripper means movable towards and away from said slot in a path extending under said first support, said gripper means being adapted to close upon said folded edge to pull said folded edge until the sheet clears said slot, and to open thereafter to release said sheet to said second support; means to actuate said forcing means and gripper means in timed sequence.

JAMES H. BRACKETT.